(12) United States Patent
Kawaguchi et al.

(10) Patent No.: US 10,619,947 B2
(45) Date of Patent: Apr. 14, 2020

(54) HEAT EXCHANGER

(71) Applicant: NGK INSULATORS, LTD., Nagoya-Shi (JP)

(72) Inventors: Tatsuo Kawaguchi, Nagoya (JP); Daisuke Kimura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/810,611

(22) Filed: Nov. 13, 2017

(65) Prior Publication Data

US 2018/0142967 A1 May 24, 2018

(30) Foreign Application Priority Data

Nov. 18, 2016 (JP) ................................. 2016-225423

(51) Int. Cl.
*F28F 13/06* (2006.01)
*F28F 13/00* (2006.01)
(Continued)

(52) U.S. Cl.
CPC ............ *F28F 13/06* (2013.01); *F01N 3/2828* (2013.01); *F01N 5/02* (2013.01); *F28D 7/106* (2013.01);
(Continued)

(58) Field of Classification Search
CPC . F28D 7/10; F28D 7/103; F28D 7/106; F28D 7/1676; F28D 21/0003; F28D 21/0015; F28F 21/04; F28F 13/06; F28F 13/003; F28F 7/02; F01N 3/2828; F01N 5/02; G05D 23/01
See application file for complete search history.

(56) References Cited

U.S. PATENT DOCUMENTS 2,249,952 A * 7/1941 Gerstung ................. F01P 11/08
165/141
4,953,627 A * 9/1990 Ito ......................... C04B 37/005
156/304.1
(Continued)

FOREIGN PATENT DOCUMENTS

EP  2799805 B1 * 10/2015 ............ B22F 3/1121
JP  07103688 A * 4/1995
(Continued)

*Primary Examiner* — Tho V Duong
(74) *Attorney, Agent, or Firm* — Burr & Brown, PLLC (57) ABSTRACT

A heat exchanger, including: a columnar honeycomb structure having cells partitioned by partition walls composed of ceramics, each cell penetrating from a first end to a second end to form a flow path for a first fluid; an inner tubular member fitted to an outer peripheral surface of the honeycomb structure to circumferentially cover that surface; a spacer directly and circumferentially covering an outer peripheral surface of the inner tubular member as well as indirectly and circumferentially covering the outer peripheral surface of the honeycomb structure; and an outer tubular member directly and circumferentially covering the spacer; wherein the spacer has a three-dimensional structure that allows flow of a second fluid therein and suppresses movement of bubbles in the second fluid; and wherein at least one opening part between the inner tubular member and the outer tubular member forms a gate of the spacer for the second fluid.

12 Claims, 3 Drawing Sheets

(51) Int. Cl.
*F28D 7/10* (2006.01)
*F28F 7/02* (2006.01)
*F01N 5/02* (2006.01)
*F01N 3/28* (2006.01)
*F28D 7/16* (2006.01)
*F28D 21/00* (2006.01)

(52) U.S. Cl.
CPC ....... *F28D 7/1676* (2013.01); *F28D 21/0003* (2013.01); *F28F 7/02* (2013.01); *F28F 13/003* (2013.01); *F01N 2240/02* (2013.01); *F28D 2021/0022* (2013.01); *F28F 2013/008* (2013.01); *F28F 2240/00* (2013.01); *F28F 2270/00* (2013.01); *Y02T 10/16* (2013.01)

(56) References Cited

U.S. PATENT DOCUMENTS

| | | | |
|---|---|---|---|
| 6,253,573 B1 * | 7/2001 | Schwitters | A23G 9/22 165/155 |
| 2014/0020877 A1 * | 1/2014 | Suzuki | F01N 3/2828 165/181 |
| 2016/0003550 A1 * | 1/2016 | Tokuda | F28F 21/04 165/140 |

FOREIGN PATENT DOCUMENTS

| | | |
|---|---|---|
| JP | 2012-037165 A1 | 2/2012 |
| JP | 2013-185806 A1 | 9/2013 |

* cited by examiner

Axial Direction (Cell Extending Direction)

[FIG. 3]

Axial Direction (Cell Extending Direction)

HEAT EXCHANGER

TECHNICAL FIELD

The present invention relates to a heat exchanger. More particularly, the present invention relates to a heat exchanger that can allow switching between promotion and suppression of heat exchange between two kinds of fluids without external control.

BACKGROUND ART

Recently, there has been a need for improvement of fuel economy of motor vehicles. Particularly, there has been a need for a system that can reduce friction loss by early warming up cooling water, an engine oil, ATF (Automatic Transmission Fluid) or like in order to prevent deterioration of fuel economy when the engine is cold, such as when the engine is started. Further, there has been a need for a system that heats a catalyst in order to activate a catalyst for cleaning an exhaust gas at an early stage.

An example of such a system is a heat exchanger. The heat exchanger is a device including a component (a heat exchange component) that performs heat exchange by allowing a first fluid to internally flow and a second fluid to externally flow. In such a heat exchanger, heat can be effectively utilized by heat exchange from a higher temperature fluid (for example, the exhaust gas) to a lower temperature fluid (for example, the cooling water).

Patent Document 1 discloses a heat exchange member capable of improving fuel economy of a motor vehicle when recovering waste heat from an exhaust gas and using the heat for warming up an engine in the field of the motor vehicle. However, the heat exchange member disclosed in Patent Document 1 has a structure in which waste heat is always recovered from the first fluid (for example, the exhaust gas) to the second fluid (for example, the cooling water), so that the waste heat may be recovered even if it is not necessary to recover the waste heat. Therefore, it has been necessary to increase a capacity of a radiator for releasing the recovered waste heat when it is not necessary to recover the waste heat. Further, there has been a problem that an increased amount of heat for heat exchange from the first fluid to the second fluid may boil the second fluid (for example, the cooling water).

Patent Document 2 describes a heat exchanger for recovering heat of an exhaust gas of an engine. The heat exchanger suppresses boiling and evaporation of the cooling water for the engine when the heat of the exhaust gas from the engine is recovered into the cooling water. The heat exchanger described in Patent Document 2 includes an exhaust gas passage and a first medium passage adjacent to each other through a second medium passage interposed therebetween, and is configured to fill the inside of the second medium passage with the liquid phase second medium when promoting the heat exchange between the exhaust gas and the first medium. Thus, according to the heat exchanger described in Patent Document 2, the heat exchange can be gently promoted while suppressing the boiling and vaporization of the first medium by heat exchange using the convection of the liquid phase second medium, as compared with a case where direct heat exchange is performed not through the second medium. Further, the heat exchanger is configured to fill the inside of the second medium passage with a gas when suppressing the heat exchange between the exhaust gas and the first medium. Therefore, according to the heat exchanger, the boiling and vaporization of the first medium can be further suppressed as compared with the heat exchange through the liquid phase second medium as described above.

CITATION LIST

Patent Literature

Patent Document 1: Japanese Patent Application Laid-open Publication No. 2012-037165 A1
Patent Document 2: Japanese Patent Application Laid-open Publication No. 2013-185806 A1

SUMMARY OF INVENTION

Technical Problem

However, the heat exchanger described in Patent Document 2 has a problem that the structure of the heat exchanger is complicated and the size of the heat exchanger is increased because the heat exchanger requires a second circulation passage, a refrigerant tank, and the like. Further, the heat exchanger requires the first medium and the second medium and is configured to not mix both media, so that the flows of the two media must be each independently controlled. Further, the heat changer has a problem that in order to return the second medium evacuated to the refrigerant tank back to the second medium passage again, a cock of the refrigerant tank must be opened and a pump must be activated, so that extra energy is consumed to perform such operation. For example, the heat exchanger disclosed in Patent Document 2 is configured such that when the second medium is vaporized and the second medium passage is filled with the gas of the second medium, the second medium which is the remaining liquid is driven out into the second circulation passage and the refrigerant tank. Further, the heat exchanger is provided with a check valve so that the second medium driven out into the second circulation passage cannot return to the second medium passage. Thus, the heat exchanger described in Patent Document 2 has very complicated configuration and requires complicated control of the device. Accordingly, there has been a need for developing a heat exchanger which has simple configuration and is easily controllable.

The present invention has been made in view of the above problems. An object of the present invention is to provide a passive heat exchanger that has a simple structure and good manufacturability and is capable of switching between promotion and suppression of heat exchange between two kinds of fluids without external control.

Solution to Problem

In order to solve the above problems, the present invention provides the following heat exchangers:

In one aspect, the present invention provides a heat exchanger, including:
- a columnar honeycomb structure having a plurality of cells partitioned by partition walls mainly composed of ceramics, each cell penetrating from a first end surface to a second end surface to form a flow path for a first fluid;
- an inner tubular member fitted to an outer peripheral side surface of the honeycomb structure to circumferentially cover the outer peripheral side surface of the honeycomb structure;

a spacer directly and circumferentially covering an outer peripheral side surface of the inner tubular member as well as indirectly and circumferentially covering the outer peripheral side surface of the honeycomb structure; and an outer tubular member directly and circumferentially covering the spacer;

wherein the spacer has a three-dimensional structure that can allow flowing of a second fluid therein and suppress movement of bubbles in the second fluid; and wherein at least one opening part between the inner tubular member and the outer tubular member forms a gate of the spacer for the second fluid.

In one embodiment of the heat exchanger according to the present invention, the spacer includes a mesh structure.

In another embodiment of the heat exchanger according to the present invention, a ratio of an area of a portion of the outer peripheral side surface of the honeycomb structure that is indirectly and circumferentially covered with the spacer, to a total area of the outer peripheral side surface of the honeycomb structure is 80% or more.

In yet another embodiment of the heat exchanger according to the present invention, the spacer is made of metal.

In yet another embodiment of the heat exchanger according to the present invention, a ratio of an area of a portion of an outer peripheral side surface of the spacer that is directly and circumferentially covered with the outer tubular member, to a total area of the outer peripheral side surface of the spacer is 80% or more.

In yet another embodiment of the heat exchanger according to the present invention, a whole of the outer peripheral side surface of the honeycomb structure is circumferentially covered with the inner tubular member.

In yet another embodiment of the heat exchanger according to the present invention, the spacer and the inner tubular member are provided as a single component.

In yet another embodiment of the heat exchanger according to the present invention, the spacer and the inner tubular member are provided as separate components.

In yet another embodiment of the heat exchanger according to the present invention, the spacer has a thickness of from 0.001 mm to 10 mm.

In yet another embodiment of the heat exchanger according to the present invention, the inner tubular member and the outer tubular member are made of different metals.

In yet another embodiment of the heat exchanger according to the present invention, the outer peripheral side surface of the inner tubular member is provided with at least one step or protrusion that prevents the spacer and the outer tubular member from moving in an axial direction of the inner tubular member.

In yet another embodiment, the heat exchanger according to the present invention further includes a casing circumferentially covering the outer tubular member, wherein the casing includes an inlet and an outlet for the second fluid, and wherein a flow path for the second fluid in communication with the spacer is formed between the casing and the outer tubular member.

In yet another embodiment of the heat exchanger according to the present invention, the at least one opening part between the inner tubular member and the outer tubular member is annularly provided at each end portion in an axial direction of the outer tubular member.

Advantageous Effects of Invention

According to the present invention, it is possible to provide a passive heat exchanger that can switch between promotion and suppression of heat exchange between two kinds of fluids without external control. For example, when used as a part of a heat exchanger for recovering waste heat from an exhaust gas of an engine, the heat exchanger according to the present invention can allow switching between promotion and suppression of heat exchange of a first fluid and a second fluid without external control.

Further, the heat exchanger according to the present invention can be constructed with simple configuration and is thus easy to be miniaturized. In addition, the heat exchanger can be produced at a lower cost because the producing process is not complicated. Thus, according to the present invention, for example, the fuel economy in motor vehicles can be improved at a lower cost, and it is thus expected that the heat exchanger of the present invention can significantly contribute to the motor vehicle industry where the environmental correspondence has been an urgent issue.

DESCRIPTION OF THE PREFERRED EMBODIMENTS

Hereinafter, embodiments of the present invention will be specifically described with reference to the drawings. It should be understood that the present invention is not limited to the following embodiments, and changes, improvements, and the like added to the following embodiments as appropriate without departing from the spirit of the present invention based on ordinary knowledge of those skilled in the art will fall within the scope of the present invention.

<1 Heat Exchanger>

Figure 1:
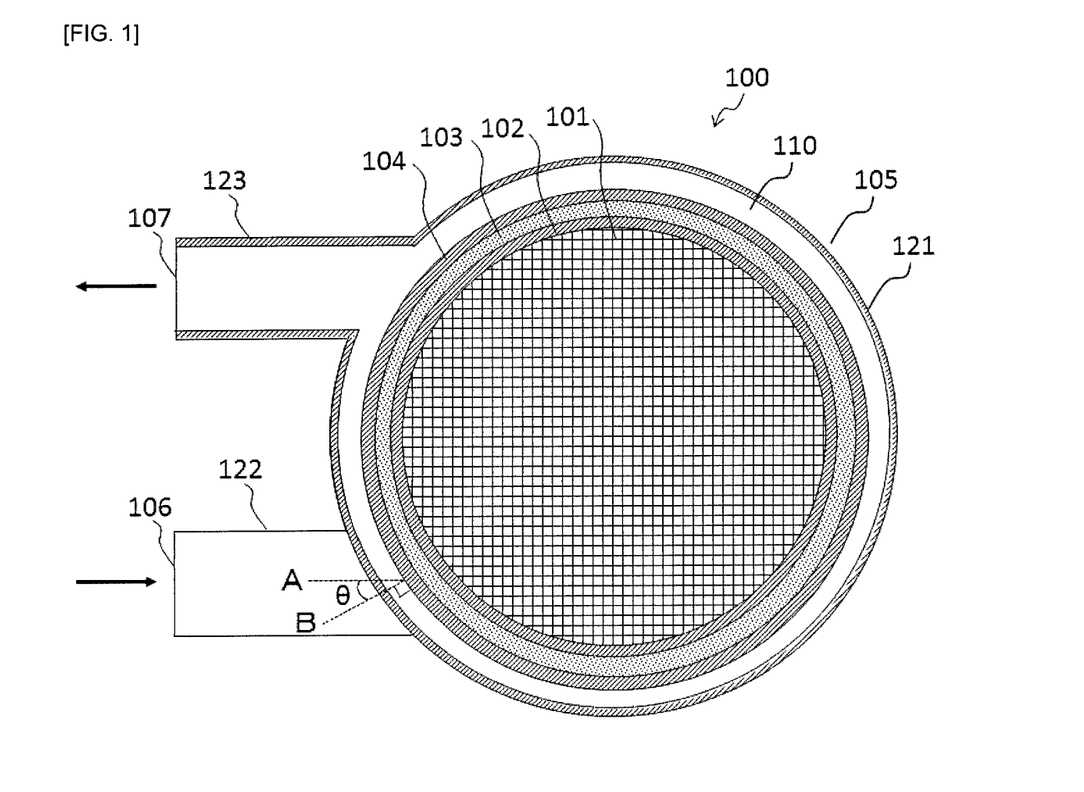
FIG. 1 is a view for explaining a structure of a cross section orthogonal to an axial direction (a cell extending direction) of a columnar honeycomb structure of a heat exchanger according to one embodiment of the present invention.
Figure 2:
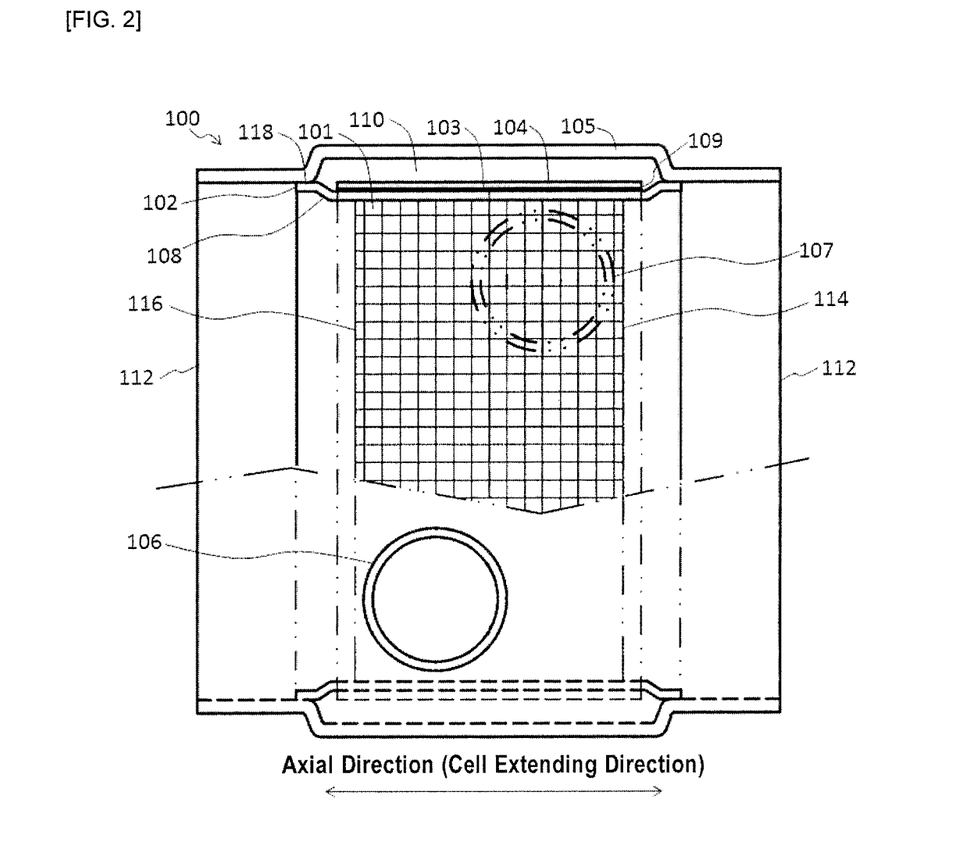
FIG. 2 is a view for explaining a structure of a cross section parallel to an axial direction (a cell extending direction) of a columnar honeycomb structure of a heat exchanger according to one embodiment of the present invention.
Figure 3:
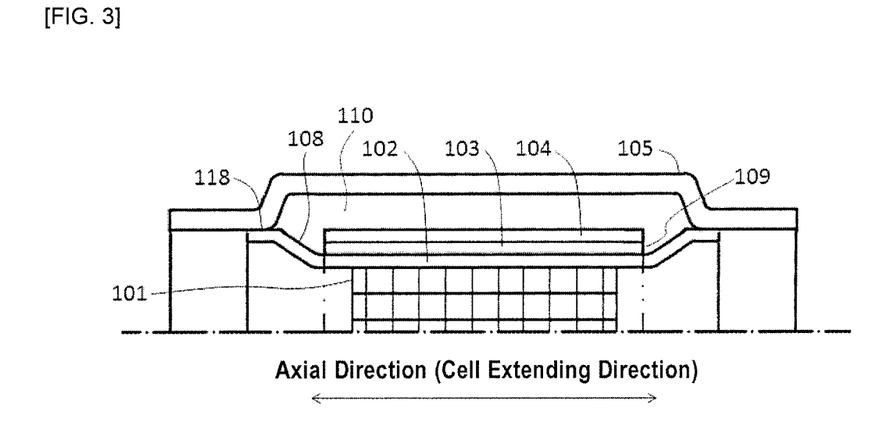
FIG. 3 is a partially enlarged view for explaining a structure of a cross section parallel to an axial direction (a cell extending direction) of a columnar honeycomb structure of a heat exchanger according to one embodiment of the present invention.

FIG. 1 shows a structure of cross section orthogonal to an axial direction (a cell extending direction) of a columnar honeycomb structure of a heat exchanger 100 according to one embodiment of the present invention. Further, FIG. 2 shows a structure of a cross sectional parallel to the axial direction (the cell extending direction) of the columnar honeycomb structure of the heat exchanger 100 according to one embodiment of the present invention. In FIG. 2, the lower side below the two-dot chain line laterally traversing near the vertical center of the heat exchanger 100 represents the external structure of the heat exchanger 100, and the upper side above the two-dot chain line represents the internal structure of the heat exchanger 100. Further, portions represented by other two-dot chain lines and dotted lines in FIG. 2 indicate outlines of components that are hidden behind. FIG. 3 shows a partially enlarged view for explaining the structure of the cross section parallel to the axial direction (the cell extending direction) of the columnar honeycomb structure of the heat exchanger according to one embodiment of the present invention. FIGS. 1 to 3 are merely schematic views for explaining the structure of the heat exchanger according to the present invention, and their dimensions and scales are different from each other.

(1-1 Core Component)

In one embodiment, the heat exchanger 100 according to the present invention includes:

- a columnar honeycomb structure 101 having a plurality of cells partitioned by partition walls mainly composed of ceramics, each cell penetrating from a first end surface 114 to a second end surface 116 to form a flow path for a first fluid;
- an inner tubular member 102 fitted to an outer peripheral side surface of the honeycomb structure 101 to circumferentially cover the outer peripheral side surface of the honeycomb structure 101;
- a spacer 103 directly and circumferentially covering an outer peripheral side surface of the inner tubular member 102 as well as indirectly and circumferentially covering the outer peripheral side surface of the honeycomb structure 101; and
- an outer tubular member 104 directly and circumferentially covering the spacer 103.

The core component of the heat exchanger 100 according to the present invention can be formed by assembling the honeycomb structure 101, the inner tubular member 102, the spacer 103 and the outer tubular member 104.

(1-1-1 Honeycomb Structure)

The honeycomb structure 101 includes a plurality of cells partitioned by the partition walls mainly composed of ceramics, each cell penetrating from the first end surface 114 to the second end surface 116 to form the flow path for the first fluid. By such a configuration, heat of the first fluid flowing through the cells of the honeycomb structure 101 can be efficiently collected and transmitted to the outside. The first fluid can flow in the front-back direction of the page of FIG. 1, and in the left-right direction of the page of FIG. 2. The first fluid that can be used includes, but not particularly limited to, various liquids and gases. For example, when the heat exchanger is used as a part of a heat exchanger mounted on a motor vehicle, the first fluid may preferably be an exhaust gas.

The shape of the honeycomb structure 101 is columnar, and is not particularly limited as long as the first fluid can flow through the cells from the first end surface 114 to the second end surface 116. For example, the honeycomb structure 101 may be circular cylindrical, elliptically cylindrical, square prism or other polygonal prism shaped. Therefore, the outer shape of the honeycomb structure 101 in the cross section orthogonal to the axial direction (the cell extending direction) of the honeycomb structure 101 may be circular, elliptical, square, or other polygonal shaped. In the embodiment shown in FIG. 1, the honeycomb structure 101 is circular cylindrical and its cross-sectional shape is circular.

The shapes of the cells in the cross section orthogonal to the axial direction (the cell extending direction) of the honeycomb structure 101 are also not particularly limited. A desired shape may be appropriately selected from a circle, an ellipse, a triangle, a square, a hexagon, and other polygons, and the like. In the embodiment shown in FIG. 1, the cross-sectional shape of the cell is square-shaped.

The partition walls of the honeycomb structure 101 are mainly composed of ceramics. The "mainly composed of ceramics" means that a mass ratio of ceramics in the total mass of the partition walls is 50% by mass or more.

The porosity of the partition walls may be preferably 10% or less, and more preferably 5% or less, and particularly preferably 3% or less. The porosity of the partition walls may also be 0%. The porosity of the partition walls of 10% or less can improve thermal conductivity.

The partition walls may preferably contain SiC (silicon carbide) having high thermal conductivity as a main component. The "contain SiC (silicon carbide) as a main component" means that a mass ratio of SiC (silicon carbide) in the total mass of the partition walls is 50% by mass or more.

More particularly, materials of the honeycomb structure 101 that can be used include Si-impregnated SiC, (Si+Al)-impregnated SiC, metal composite SiC, recrystallized SiC, $Si_3N_4$, SiC, and the like.

There is no particular limitation for cell density (i.e., the number of cells per unit area) in the cross section orthogonal to the axial direction (the cell extending direction) of the honeycomb structure 101. The cell density may be designed as needed, but may be preferably in a range of 4 to 320 cells/cm$^2$. The cell density of 4 cells/cm$^2$ or more can lead to sufficient strength of the partition walls, and hence sufficient strength and effective GSA (geometric surface area) of the honeycomb structure 101 itself. Further, the cell density of 320 cells/cm$^2$ or less can prevent an increase in pressure loss when the first fluid flows.

The honeycomb structure 101 may preferably have an isostatic strength of 1 MPa or more, and more preferably 5 MPa or more. If the isostatic strength of the honeycomb structure 101 is 1 MPa or more, the honeycomb structure 101 can have sufficient durability. The upper limit value of the isostatic strength of the honeycomb structure 101 may be about 100 MPa. The isostatic strength of the honeycomb structure 101 can be measured according to the method for measuring the isostatic fracture strength defined in the JASO standard M505-87 which is the motor vehicle standard issued by Society of Automotive Engineers of Japan, Inc.

The diameter of the honeycomb structure 101 in the cross section orthogonal to the cell extending direction may be preferably from 20 mm to 200 mm, and more preferably from 30 mm to 100 mm. Such a diameter can improve heat recovery efficiency. If the shape of the honeycomb structure 101 in the cross section orthogonal to the cell extending direction is not circular, the diameter of the maximum inscribed circle that is inscribed in the shape of the cross section of the honeycomb structure 101 is defined as the diameter of the honeycomb structure 101 in the cross section orthogonal to the cell extending direction.

The thickness of the partition walls of the cells of the honeycomb structure 101 may be appropriately designed according to a purpose, and is not particularly limited. The thickness of the partition walls may be preferably from 0.1 mm to 1 mm, and more preferably from 0.2 mm to 0.6 mm. The thickness of the partition walls of 0.1 mm or more can lead to sufficient mechanical strength and prevent breakage due to impact or thermal stress. Further, the thickness of the partition walls of 1 mm or less can prevent problems such as an increase in pressure loss of the first fluid and a decrease in heat recovery efficiency when the heat medium permeates.

The partition walls may preferably have a density of from 0.5 g/cm$^3$ to 5 g/cm$^3$. The density of the partition walls of 0.5 g/cm$^3$ or more can lead to sufficient strength of the partition walls and prevent the partition walls from being damaged by resistance when the first fluid passes through the inside of the flow path (inside the cell). Further, the density of the partition walls of 5 g/cm$^3$ or less can reduce the weight of the honeycomb structure 101. The density within the above range can lead to a strengthened honeycomb structure and also produce an effect of improving thermal conductivity. The density of the partition walls is a value measured by the Archimedes method.

The honeycomb structure 101 may preferably have a thermal conductivity of 50 W/(m·K) or more, and more preferably from 100 W/(m·K) to 300 W/(m·K), and more preferably from 120 W/(m·K) to 300 W/(m·K). The thermal conductivity of the honeycomb structure 101 within such a range can lead to good thermal conductive properties and efficiently transfer heat in the honeycomb structure to the inner tubular member 102. The value of thermal conductivity is measured by the laser flash method (JIS R1611-1997).

When an exhaust gas is flowed as the first fluid through the cells of the honeycomb structure 101, a catalyst may preferably be supported on the partition walls of the honeycomb structure. The supporting of the catalyst on the partition walls can allow conversion of CO, NOx, HC and the like in the exhaust gas to harmless substances by the catalytic reaction, and additionally allow reaction heat generated during the catalytic reaction to be used for heat exchange. The catalyst may preferably include at least one element selected from the group consisting of noble metals (platinum, rhodium, palladium, ruthenium, indium, silver and gold), aluminum, nickel, zirconium, titanium, cerium, cobalt, manganese, zinc, copper, tin, iron, niobium, magnesium, lanthanum, samarium, bismuth, and barium. The at least one element as listed above may be contained as a metal simple substance, a metal oxide, and other metal compounds.

An amount of the catalyst (catalyst metal+support) to be supported may be preferably from 10 g/L to 400 g/L. Further, for the catalyst containing the noble metal, the amount of the catalyst to be supported may be preferably from 0.1 g/L to 5 g/L. If the amount of the catalyst (catalyst metal+support) to be supported is 10 g/L or more, the catalysis will tend to occur. On the other hand, if the amount of the catalyst to be supported is 400 g/L or less, pressure loss can be suppressed and an increase in a manufacturing cost can be thus suppressed. The support refers to a carrier on which the catalytic metal is supported. The support may preferably include at least one selected from the group consisting of alumina, ceria and zirconia.

(1-1-2 Inner Tubular Member)

The inner tubular member 102 is fitted to the outer peripheral side surface of the honeycomb structure 101 to circumferentially cover the outer peripheral side surface of the honeycomb structure 101. The "fitted" as used herein means that the honeycomb structure 101 and the inner tubular member 102 are fixed in a state where these are fitted to each other. Therefore, the fitting of the honeycomb structure 101 and the inner tubular member 102 includes cases where the honeycomb structure 101 and the inner tubular member 102 are fixed to each other by fitting such as clearance fit, interference fit and shrink fit, as well as by brazing, welding, diffusion bonding and the like.

The inner tubular member 102 may have an inner surface shape corresponding to the outer peripheral side surface of the honeycomb structure 101. By directly contacting the inner peripheral side surface of the inner tubular member 102 with the outer peripheral side surface of the honeycomb structure 101, the thermal conductivity can be improved, so that heat in the honeycomb structure 101 can be efficiently transferred to the inner tubular member 102.

It is preferable to have a higher ratio of an area of a portion of the outer peripheral side surface of the honeycomb structure 101 that is circumferentially covered with the inner tubular member 102, to a total area of the outer peripheral side surface of the honeycomb structure 101, in terms of increasing heat recovery efficiency. Specifically, such an area ratio may be preferably 80% or more, and more preferably 90% or more, and more preferably 100% (i.e., the whole outer peripheral side surface of the honeycomb structure 101 is circumferentially covered with the inner tubular member 102). The term "side surface" as used herein refers to a surface parallel to the axial direction (the cell extending direction) of the honeycomb structure, and does not include a surface orthogonal to the axial direction (the cell extending direction) of the honeycomb structure.

The material of the inner tubular member 102 is not particularly limited. However, materials having good thermal conductivity such as metals, ceramics and the like are desirable. Among them, the metals may be preferred in terms of manufacturability (ease of assembly). The metals that can be used include stainless steel, titanium alloys, copper alloys, aluminum alloys, brass and the like. Among them, the stainless steel may be preferred for the reason of its high endurance reliability.

The inner tubular member 102 may preferably have a thickness of 0.1 mm or more, and more preferably 0.3 mm or more, and still more preferably 0.5 mm or more, in terms of endurance reliability. The thickness of the inner tubular member 102 may be preferably 10 mm or less, and more preferably 5 mm or less, and still more preferably 3 mm or less, for the reason of reducing thermal resistance.

The outer peripheral side surface of the inner tubular member 102 is preferably provided with at least one step or protrusion that prevents the spacer 103 and the outer tubular member 104 from moving in an axial direction of the inner tubular member 102. Thus, the spacer 103 and the outer tubular member 104 can be prevented from slipping off from the inner tubular member 102 in the axial direction. Preferably, the step or protrusion 108 may be provided so as to surround the outer peripheral side surface of the inner tubular member 102, in order to enhance the movement prevention effect. In the embodiment shown in FIG. 2, on both external sides of the axial direction region where the spacer 103 and the outer tubular member 104 are placed, upward steps are circumferentially provided on the outer peripheral side surface of the inner tubular member 102.

(1-1-3 Spacer)

The spacer 103 directly and circumferentially covers the outer peripheral side surface of the inner tubular member 102, as well as indirectly and circumferentially covers the outer peripheral side surface of the honeycomb structure 101. Further, the spacer 103 is directly and circumferentially covered with the outer tubular member 104. Therefore, the spacer 103 will be disposed in a space between the outer peripheral side surface of the inner tubular member 102 and the inner peripheral side surface of the outer tubular member 104, and an extent of the space can be easily adjusted by changing the thickness of the spacer 103. Between the inner tubular member 102 and the outer tubular member 104, at least one opening part 109 is formed, which serves as a gate of the spacer for the second fluid. Preferably, the at least one opening part 109 may be annularly provided at each end portion in the axial direction of the outer tubular member 104, in order to enhance uniformity when the second fluid flows out from the spacer 103 or flows into the spacer 103.

The spacer 103 can allow flowing of the second fluid therein and have a three-dimensional structure capable of suppressing movement of bubbles in the second fluid. The flowing of the second fluid through the inside of the spacer 103 allows heat exchange with the first fluid flowing through the honeycomb structure 101. Further, this configuration is effective for obtaining a passive heat exchange function capable of switching between promotion and suppression of heat exchange between the two kinds of fluids without external control. The second fluid is not particularly limited, but when the heat exchanger is used as a heat exchanger mounted on the motor vehicle, the second fluid may be preferably water or antifreezing fluid (LLC as defined by JIS K 2234: 2006).

For example, when "an exhaust gas" is used as the first fluid and "a refrigerant" is used as the second fluid, the following phenomenon would occur. When the temperature of the outer peripheral side surface of the inner tubular member 102 is less than a boiling point of the refrigerant and the refrigerant in the form of liquid flows into the spacer 103, the inside of the three-dimensional structure of the spacer 103 is filled with the refrigerant in the form of liquid as it is, so that the heat exchange between the exhaust gas and the refrigerant can be promoted. On the other hand, when the temperature of the outer peripheral side surface of the inner tubular member 102 is equal to or higher than the boiling point of the refrigerant and the refrigerant in the form of liquid flows into the spacer 103, at least a part of the refrigerant in the three dimensional structure of the spacer will be boiled and evaporated, so that gaseous refrigerant will be present in the three-dimensional structure, whereby the heat exchange between the exhaust gas and the refrigerant is suppressed. The gaseous refrigerant in the spacer 103 has a lower heat capacity per unit volume than that of the refrigerant in the form of liquid and functions as a heat insulating material. Therefore, the refrigerant in the form of liquid is likely to maintain a non-contact state of the outer peripheral side surface of the inner tubular member 102, thereby suppressing the heat exchange between the first fluid (the exhaust gas) and the second fluid (the refrigerant).

Thus, by selecting the second fluid having the boiling point lower than the temperature at which the heat exchange is desired to be suppressed and higher than the temperature at which the heat exchange is desired to be promoted, the gaseous second fluid generated by the boiling and evaporation will be present in the three dimensional structure of the spacer 103 when the outer peripheral side surface of the inner tubular member 102 is in the temperature range within which the heat exchange is desired to be suppressed, so that the heat exchange between the first fluid and the second fluid is suppressed. On the other hand, when the outer peripheral side surface of the inner tubular member is in a temperature range within which the heat exchange is desired to be promoted, the inside of the three-dimensional structure of the spacer 103 is filled with the second fluid in the form of liquid, so that the heat exchange is promoted.

Further, bubbles are generated when the second fluid is boiled and vaporized in the three-dimensional structure of the spacer 103. In the present invention, the movement of bubbles is suppressed by the three-dimensional structure of the spacer 103 so as to facilitate the retention of the gaseous second fluid inside the spacer 103, thereby improving the effect of suppressing the heat exchange between the first fluid and the second fluid. There is no particular restriction on the three-dimensional structure capable of suppressing the movement of bubbles in the second fluid. If the three-dimensional structure is present in a part of the space between the outer peripheral side surface of the inner tubular member 102 and the inner peripheral side surface of the outer tubular member 104, the bubbles in the second fluid can adhere to an object forming the three dimensional structure or an object (a physical component) forming the three-dimensional structure can obstruct the movement of the bubbles in the second fluid, thereby preventing the bubbles from flowing out of the three dimensional structure. In other words, the inside of the spacer 103 is easily filled with the gas of the second fluid, so that the heat shielding property by the spacer 103 can be improved.

Further, when the second fluid is boiled and vaporized at once, vibrations may be generated in the heat exchanger or a great boiling sound may be generated due to the sudden volume expansion. The spacer 103 has the three dimensional structure, which increases moving resistance of the second fluid, so that the liquid second fluid will gently flow in the spacer 103. This will result in an effect of effectively suppressing the generation of the vibration and boiling sound.

Specific examples of the three dimensional structure include mesh structures (three-dimensional network structures) and sponge-shaped structures. Among them, the mesh structures may be preferred because they tend to achieve both of the heat shielding performance and the flowability of the second fluid.

The spacer 103 may preferably have a porosity of 20% or more, and more preferably 40% or more, and still more preferably 60% or more, for the reason of the heat shielding property. Further, the spacer 103 may preferably have a porosity of 98% or less, and more preferably 95% or less, and still more preferably 90% or less, for the purpose of increasing the retention ability of the bubbles. In the present invention, the porosity of the spacer 103 is measured by the following procedure:

(1) true density of the material forming the spacer is determined by the Archimedes method;

(2) bulk density is determined by an apparent volume calculated from the external dimensions (thickness, length and width) of the spacer and the weight of the spacer; and (3) porosity=(1−bulk density/true density)×100%.

It is preferable to have a higher ratio of an area of a portion of the outer peripheral side surface of the honeycomb structure 101 that is indirectly and circumferentially covered with the spacer 103, to a total area of the outer peripheral side surface of the honeycomb structure 101, in terms of increasing the heat recovery efficiency when the heat exchange is desired to be promoted and of decreasing the heat recovery efficiency when the heat exchange is desired to be suppressed. Specifically, the area ratio may be preferably 80% or more, and more preferably 90% or more, and even more preferably 100% (i.e., the whole outer peripheral side surface of the honeycomb structure 101 is indirectly and circumferentially covered with the spacer 103). The term "side surface" as used herein refers to a surface parallel to the axial direction (the cell extending direction) of the honeycomb structure, and does not include a surface orthogonal to the axial direction (the cell extending direction) of the honeycomb structure.

Here, the spacer 103 has the three-dimensional structure that allows flowing of the second fluid therein, so that a space through which the second fluid flows is provided inside the spacer 103. It may be possible to define that such a space portion is not considered to be an element for covering the honeycomb structure 101. In the present specification, however, the space portion is considered to be the element for covering the honeycomb structure 101, and the area ratio as stated above is calculated. Accordingly, calculation of the area where the honeycomb structure 101 is covered is conducted on the assumption that the inside of the spacer 103 is solid.

The material of the spacer 103 is not particularly limited. However, materials having good thermal conductivity such as metals, ceramics and the like are desirable. Among them, the metals may be preferable in terms of manufacturability (ease of assembly). The metals that can be used include stainless steel, titanium alloys, copper alloys, aluminum alloys, brass and the like. Among them, stainless steel may be preferred because of its high endurance reliability.

The spacer 103 may preferably have a thickness of 0.001 mm or more, and more preferably 0.01 mm or more, and still more preferably 0.1 mm or more, in terms of improving the heat shielding effect when the heat exchange is desired to be suppressed. The thickness of the spacer 103 may be preferably 10 mm or less, and more preferably 1 mm or less, and still more preferably 0.5 mm or less, in terms of facilitating the retention of bubbles. The thickness of the spacer 103 is defined as a distance between the outer peripheral side surface of the inner tubular member 102 and the inner peripheral side surface of the outer tubular member 104.

The spacer 103 may be provided as a single component integrated with the inner tubular member 102 or may be provided as a separate component from the inner tubular member 102. Examples of a method for providing the spacer 103 as a single component include a method for forming a three-dimensional structure that functions as the spacer 103 by subjecting the outer peripheral side surface of the inner tubular member 102 to surface processing with cutting, plating, embossing, laser processing, chemical etching, blasting or the like. Examples of a method for providing the spacer 103 as the separate component include forming the spacer 103 from a flexible structure such as a mesh or a sponge, and winding and tightening the spacer 103 onto the outer side surface of the inner tubular member 102.

(1-1-4 Outer Tubular Member)

The outer tubular member 104 directly and circumferentially covers the spacer 103. The outer tubular member 104 may have an inner side surface shape corresponding to the outer peripheral side surface of the spacer 103. Direct contact of the inner peripheral side surface of the outer tubular member 104 with the outer peripheral side surface of the spacer 103 can lead to good thermal conductivity, and efficiently transfer the heat within the spacer 103 to the outer tubular member 104 when the heat exchange is desired to be promoted.

It is preferable to have a higher ratio of an area of a portion of the outer peripheral side surface of the spacer 103 that is directly and circumferentially covered with the outer tubular member 104, to a total area of the outer peripheral side surface of the spacer 103, in terms of increasing the heat recovery efficiency when the heat exchange is desired to be promoted and of decreasing the heat recovery efficiency when the heat exchange is desired to be suppressed. Specifically, the area ratio may be preferably 80% or more, and more preferably 90% or more, and even more preferably 100% (i.e., the whole outer peripheral side surface of the spacer 103 is circumferentially covered with the outer tubular member 104). The term "side surface" as used herein refers to a surface parallel to the axial direction (the cell extending direction) of the honeycomb structure, and does not include a surface orthogonal to the axial direction (the cell extending direction) of the honeycomb structure.

"A total area of the outer peripheral side surface of the spacer 103" refers to a projected area of a figure formed by the contour of the outer peripheral side surface of the spacer 103 when the spacer 103 is developed on a plane. The "area of a portion of the outer peripheral side surface of the spacer 103, which portion is directly and circumferentially covered with the outer tubular member 104" means a projected area of a figure formed by the contour of the portion of the outer peripheral side surface of the spacer 103, which portion is covered with the outer tubular member 104, when such a portion is developed on a plane.

The material of the outer tubular member 104 is not particularly limited. However, materials having good thermal conductivity such as metals, ceramics and the like are desirable. Among them, the metals may be preferred in terms of manufacturability (ease of assembly). Examples of the metals include stainless steel, titanium alloys, copper alloys, aluminum alloys, brass and the like. Among them, the copper alloys may be preferable because of thermal conductivity. The material of the outer tubular member 104 may be the same as or different from that of the inner tubular member 102. The outer tubular member 104 can be fixed with practical strength only by winding and tightening it on the outer peripheral side surface of the spacer 103. Welding the outer tubular member 104 with a casing 105 is not required for fixing it. Therefore, the heat exchanger 100 according to the present invention can have a higher degree of freedom in selecting materials. Accordingly, it is easy to form the inner tubular member 102 and the outer tubular member 104 using different metals. For example, the inner tubular member 102 may be made of stainless steel and the outer tubular member 104 may be made of copper or the copper alloy. This configuration can provide an advantage that the efficiency of heat recovery by the second fluid can be improved while preventing corrosion due to the exhaust gas.

The outer tubular member 104 may preferably have a thermal conductivity of 10 W/(m·K) or more, and more preferably 100 W/(m·K) or more, and even more preferably 200 W/(m·K) or more, at 25° C., in terms of improving the heat recovery efficiency. The value of thermal conductivity is a value measured by the laser flash method (JIS R1611: 1997).

The outer tubular member 104 may preferably have a thickness of 0.01 mm or more, and more preferably 0.05 mm or more, and still more preferably 0.1 mm or more, because of its endurance reliability. The thickness of the outer tubular member 104 may preferably be 10 mm or less, and more preferably 5 mm or less, and still more preferably 1 mm or less, in terms of heat recovery performance.

(1-2 Casing)

In one embodiment, the heat exchanger 100 according to the present invention includes, in addition to the core component, a casing 105 that circumferentially covers the outer tubular member 104. The casing 105 preferably includes a tubular portion 121 that circumferentially covers the entire core component. The casing 105 includes an inlet 106 for the second fluid, an inlet conduit 122 connecting the inlet 106 to the tubular portion 121, an outlet 107 for the second fluid, and an outlet conduit 123 connecting the outlet 107 to the tubular portion 121. A flow path 110 for the second fluid that is in communication with the spacer 103 is formed between the casing 105 and the outer tubular member 104. The second fluid flows through the inlet 106 into the casing 105 in a liquid state. At least a part of the second fluid then flows through the flow path 110 into the spacer 103. The second fluid undergoes the promoted or suppressed heat exchange in the spacer 103, and then flows out of the outlet 107 through the flow path 110.

If the flow direction of the second fluid when it reaches the outer peripheral side surface of the outer tubular member 104 through the inlet conduit 122 is perpendicular to the outer peripheral side surface of the outer tubular member

104, an increase in pressure loss will be caused. Therefore, the inlet conduit 122 may preferably be arranged such that a straight line extending from the central axis of the inlet conduit 122 in a longitudinal direction of the inlet conduit 122 does not perpendicularly intersect with the outer peripheral side surface of the outer tubular member 104. Specifically, referring to FIG. 1, the angle θ ($0° \leq θ \leq 90°$) made by the straight line A extending from the central axis of the inlet conduit 122 in the longitudinal direction of the inlet conduit 122 and the normal line B of the peripheral side surface, at the intersection point between the straight line A and the peripheral side surface of the outer tubular member 104 may preferably be $10° \leq θ \leq 90°$, and more preferably $30° \leq θ \leq 90°$.

Preferably, the outer peripheral side surface of the inner tubular member 102 may be circumferentially in close contact with the inner surface of the casing 105 at both end portions 118 in the axial direction (the cell extending direction) of the inner tubular member 102, so as to prevent the second fluid from leaking to the outside. The method of bringing the outer peripheral side surface of the inner tubular member 102 and the inner surface of the casing 105 into close contact with each other includes, but not particularly limited to, welding, diffusion bonding, brazing, and the like. Among them, welding may be preferred because of its high endurance reliability.

The material of the casing 105 is not particularly limited. However, materials having good thermal conductivity such as metals, ceramics and the like. Among them, the metals may be preferred because of manufacturability (ease of assembly). The metals that can be used include stainless steel, titanium alloys, copper alloys, aluminum alloys, brass and the like. Among them, the stainless steel may be preferred because of its high endurance reliability.

The casing 105 may preferably have a thickness of 0.1 mm or more, and more preferably 0.5 mm or more, and still more preferably 1 mm or more, in terms of endurance reliability. The thickness of the casing 105 may preferably be 10 mm or less, and more preferably 5 mm or less, and still more preferably 3 mm or less, in terms of the costs, volume, weight and the like.

For example, when the heat exchanger 100 is used for recovering waste heat from the exhaust gas of the engine, both end portions 112 of the casing 105 in a direction parallel to the axial direction (the cell extending direction) of the honeycomb structure 101 may be connectable to piping through which the exhaust gas of the engine passes. If the inner diameter of the piping through which the exhaust gas passes is different from the inner diameters of the both end portions of the casing 105, a gas introduction pipe in which the inner diameter of the pipe is gradually increased or gradually decreased may be provided between the piping and the casing 105, or the piping and the casing 105 may be directly connected to each other.

(2 Production Method)

Next, a method for producing the heat exchanger 100 according to the present invention will be exemplarily described.

(2-1 Production of Honeycomb Structure)

First, a green body containing ceramic powder is extruded into a desired shape to produce a honeycomb formed body. As a material for the honeycomb formed body, the above-mentioned ceramics can be used. For example, when producing a honeycomb formed body mainly composed of a Si-impregnated SiC composite material, a binder and water or an organic solvent are added to a predetermined amount of SiC powder, and the resultant mixture is kneaded to obtain a green body, which is then formed to obtain a honeycomb formed body having a desired shape. The resulting honeycomb formed body can then be dried, impregnated with metallic Si and sintered in an inert gas under a reduced pressure or in a vacuum, to obtain a honeycomb structure 101 including a plurality of cells partitioned by the partition walls.

(2-2 Fitting of Honeycomb Structure and Inner Tubular Member)

The honeycomb structure 101 is then inserted into the inner tubular member 102, so that the outer peripheral side surface of the honeycomb structure 101 is circumferentially covered. By conducting shrink fit in this state, the inner peripheral side surface of the inner tubular member 102 is fitted to the outer peripheral side surface of the honeycomb structure 101. Other than the shrink fit, the honeycomb structure 101 and the inner tubular member 102 may be fitted to each other by the fixing method such as clearance fit and interference fit, or by brazing, welding, diffusion bonding or the like, as stated above.

(2-3-1 Winding of Spacer)

When providing the spacer 103 and the inner tubular member 102 as separate components, the spacer 103 is wound so as to directly and circumferentially cover the outer peripheral side surface of the inner tubular member 102 while indirectly and circumferentially cover the outer peripheral side surface of the honeycomb structure 101. The winding of the spacer 103 may be performed before or after fitting the inner tubular member to the honeycomb structure.

(2-3-2 Forming of Spacer)

When providing the spacer 103 and the inner tubular member 102 as a single component, the outer peripheral side surface of the inner tubular member 102 is subjected to surface processing by cutting, plating, embossing, laser processing, chemical etching, blasting or the like to form a three-dimensional structure that functions as the spacer 103. The spacer 103 may be formed either before or after fitting the inner tubular member 102 to the honeycomb structure 101.

(2-4 Winding of Outer Tubular Member)

After winding the spacer 103, the outer tubular member 104 is wound so as to circumferentially cover the spacer 103. Before being wound around the spacer 103, the outer tubular member 104 may have a flat plate shape, and may be changed into a tubular shape after winding. After being wound, the wound end portion of the outer tubular member 104 may be preferably joined to itself by welding or the like, such that the outer tubular member 104 can maintain the state where it tightly winds around the spacer 103. The winding of the outer tubular member 104 may be carried out before or after fitting the inner tubular member 102 to the honeycomb structure 101.

In addition, the outer tubular member 104 may be tubular from the beginning, in which case the inner tubular member 102 with the spacer formed on the outer peripheral side surface can be inserted into the outer tubular member 104 and fixed by interference fit or the like.

The core component is thus completed by assembling the honeycomb structure 101, the inner tubular member 102, the spacer 103, and the outer tubular member 104. By configuring the core component as an assembly that cannot be disassembled without applying force from the outside, handling of the heat exchanger can be facilitated.

(2-5 Attachment of Casing)

The casing 105 including the elements as stated above is formed by molding, bending, cutting or the like, and the casing 105 is joined to the core component so as to circumferentially cover the outer tubular member 104 of the core component. Typically, the core component can be inserted into the tubular portion 121 of the casing 105 and joined together by welding, brazing or the like. In this process, the outer peripheral side surface of the inner tubular member 102 at both end portions 118 in the axial direction (the cell extending direction) of the inner tubular member 102 may preferably be in circumferentially close contact with the inner surface of the casing, in order to prevent the second fluid from leaking to the outside.

According to such procedures, the heat exchanger in which the core component and the casing was combined can be produced. However, the method for producing the heat exchanger of the present invention is not limited to the producing method as described above.

EXAMPLES

Hereinafter, the present invention will be more specifically described with reference to working examples, but the present invention is not limited to these working examples.

Example 1

(Production of Honeycomb Structure)

A green body containing SiC powder was extruded into a desired shape, and then dried, processed into predetermined external dimensions, and then impregnated with Si and sintered to produce a circular cylindrical honeycomb structure 101. The honeycomb structure 101 had a diameter (external form) of an end surface of 55.4 mm and a length in the cell extending direction of 40 mm. Each cell had a square shape in the cross section orthogonal to the axial direction (the cell extending direction) of the honeycomb structure 101. The honeycomb structure 101 had a cell density of 23 cells/cm$^2$ and a thickness (a wall thickness) of each partition wall of 0.3 mm. The honeycomb structure 101 had a thermal conductivity of 150 W/(m K) at 25° C. The honeycomb structure 101 had an isostatic strength of 30 MPa.

(Assembly of Heat Exchanger)

An inner tubular member 102 made of stainless steel was then produced. The inner tubular member 102 had a first tubular portion having an inner diameter of 55.2 mm and a length in the axial direction of 44 mm. Further, the inner tubular member 102 had second tubular portions each having an inner diameter of 56.5 mm and a length in the axial direction of 5 mm at both end portions of the first tubular portion via the upward step 108 as shown in FIG. 2. The inner tubular member 102 had a wall thickness of 1.0 mm.

The honeycomb structure 101 was then inserted into the center of the inside of the produced inner tubular member 102, and the entire outer peripheral side surface of the honeycomb structure 101 was circumferentially covered with the inner tubular member 102 (see FIG. 2). The inner peripheral side surface of the inner tubular member 102 was then fitted to the outer peripheral side surface of the honeycomb structure 101 by shrink fit.

A stainless steel spacer 103 (external dimension: 42 mm (a length in the axial direction)×180 mm (a length in the circumferential direction)×0.1 mm (a thickness before winding)) having a mesh structure (a porosity of 60%) was then wound so as to directly and circumferentially cover the outer peripheral side surface of the inner tubular member 102 as well as indirectly and circumferentially cover the outer peripheral side surface of the honeycomb structure 101 (see FIG. 2). In this case, the ratio of the area of the portion of the outer peripheral side surface of the honeycomb structure 101 that was indirectly and circumferentially covered with the spacer 103, to the total area of the outer peripheral side surface of the honeycomb structure 101, was 100%.

An outer tubular member 104 having a flat plate shape (external dimension: 40 mm (a length in the axial direction)×180.5 mm (a length in the circumferential direction)× 0.5 mm (a thickness)), made of a copper alloy (having a thermal conductivity of 380 W/(m·K) at 25° C.) was then prepared and wound so as to circumferentially cover the spacer 103 (see FIG. 2). As a result, the opening part 109 between the inner tubular member 102 and the outer tubular member 104 was annularly formed at each end portion in the axial direction of the outer tubular member 104. The ratio of the area of the portion of the outer peripheral side surface of the spacer 103 that was directly and circumferentially covered with the outer tubular member 104, to the total area of the outer peripheral side surface of the spacer 103, was 100%. After winding the outer tubular member 104 around the spacer 103, the wound end portion of the outer tubular member 104 was welded to itself (the outer tubular member 104) by welding. Here, a distance between the outer peripheral side surface of the inner tubular member 102 and the inner peripheral side surface of the outer tubular member 104 (thickness of the spacer) was 0.1 mm, which was the same as the distance before being wound.

By assembling the honeycomb structure 101, the inner tubular member 102, the spacer 103, and the outer tubular member 104 according to the above procedures, the core component was produced.

Next, a stainless steel cylindrical casing 105 including a tubular portion 121, an inlet 106, an inlet conduit 122 for connecting the inlet 106 to the tubular portion 121, an outlet 107, and an outlet conduit 123 for connecting the outlet 107 to the tubular portion 121, as shown in FIGS. 1 and 2, was formed by molding, and the core component was inserted into the inside of the casing 105 to circumferentially cover the entire core component including the outer tubular member 104. The outer peripheral side surface of each end portion in the axial direction (the cell extending direction) of the inner tubular member 102 was brought into circumferentially close contact with the inner surface of the casing 105 by welding (see FIG. 2). Between the casing 105 and the outer tubular member 104, the center portion in the axial direction of the casing 105 had a larger inner diameter than the both end portions in the axial direction (a larger cross sectional area orthogonal to the axial direction) such that a sufficient flow path for the second fluid in communication with the spacer 103 was formed. The casing 105 had a wall thickness of 1.5 mm. The angle θ made by the straight line A extending from the central axis of the inlet conduit 122 in the longitudinal direction of the inlet conduit 122 and the normal line B of the peripheral side surface, at the intersection point between the straight line A and the peripheral side surface of the outer tubular member 104 was set at 38°.

Through the above procedure, the heat exchanger according to the inventive example in which the core component and the casing was combined was produced.

Comparative Example 1

A heat exchanger similar to that of Example 1 was produced with the exception that the spacer 103 and the outer tubular member 104 were removed from the heat exchanger of Example 1.

(Heat Exchange Test)

The heat exchangers of Example 1 and Comparative Example 1 thus produced were subjected to a heat exchange test by the following method. Air (a first fluid) at 400° C. (=Tg1) flowed through the honeycomb structure 101 at each flow rate (Mg) as shown in Tables 1 and 2. On the other hand, cooling water (a second fluid) at each temperature described in Table 1 and Table 2 was supplied from the inlet 106 at a flow rate (Mw) of 166.3 g/s, and the cooling water (the second fluid) after the heat change was recovered from the outlet 107.

The air and cooling water started to be supplied to the heat exchanger under each condition as stated above, and immediately after the air and cooling water passed through the heat exchanger for 5 minutes, the temperature (Tw1) of the cooling water at the inlet 106 of the heat exchanger and the temperature (Tw2) of the cooling water at the outlet 107 were measured, and heat recovery efficiency was determined.

Here, heat quantity Q recovered by the cooling water is expressed by the following equation:

$$Q \text{ (kW)} = \Delta Tw \times Cpw \times Mw$$

in which $\Delta Tw = Tw2 - Tw1$, Cpw (specific heat of water) =4182 J/(kg·K).

The heat recovery efficiency n by the heat exchanger is expressed by the following equation:

$$\eta (\%) = Q/\{(Tg1 - Tw1) \times Cpg \times Mg\} \times 100$$

in which Cpg (specific heat of air)=1050 J/(kg·K).
Results are shown in Tables 1 and 2.

TABLE 1

| | Flow Rate of Air: 10 g/s | |
|---|---|---|
| Temperature of | Heat Recovery Efficiency | |
| Cooling Water (Tw1) | Comparative Example 1 | Example 1 |
| 40° C. | 35% | 35% |
| 60° C. | 35% | 30% |
| 80° C. | 35% | 10% |

TABLE 2

| | Flow Rate of Air: 50 g/s | |
|---|---|---|
| Temperature of | Heat Recovery Efficiency | |
| Cooling water (Tw1) | Comparative Example 1 | Example 1 |
| 40° C. | 15% | 15% |
| 60° C. | 15% | 10% |
| 80° C. | 15% | 3% |

In Comparative Example 1, no change in the heat recovery efficiency could be found regardless of an increase in the temperature of the cooling water, so that the heat recovery was continued even if the temperature of the cooling water was increased, as shown in Tables 1 and 2. On the other hand, in Example 1, the heat recovery efficiency was higher when the temperature of the cooling water was low and the heat recovery was required, but the heat recovery efficiency was decreased when the temperature of the cooling water was high and no heat recovery was required. This would be because when the cooling water flowed in at a high temperature, the temperature of the outer peripheral side surface of the inner tubular member become also high, so that the water easily boiled inside the spacer, and a heat insulating layer of bubbles of water vapor was formed inside the spacer. Incidentally, in each of Example 1 and Comparative Example 1, the heat recovery efficiency was decreased as the flow rate of air was increased.

Thus, the heat exchanger according to the present invention can be easily assembled with the simple structure, and can switch between promotion and suppression of heat exchange between two kinds of fluids without external control.

DESCRIPTION OF REFERENCE NUMERALS

100 heat exchanger
101 honeycomb structure
102 inner tubular member
103 spacer
104 outer tubular member
105 casing
106 inlet for second fluid
107 outlet for second fluid
108 step or protrusion
109 opening part
110 flow path for second fluid
112 end portion of casing
114 first end surface of honeycomb structure
116 second end surface of honeycomb structure
118 end portion of inner tubular member
121 tubular portion
122 inlet conduit
123 outlet conduit

What is claimed is:

1. A heat exchanger, comprising:
   a columnar honeycomb structure that has a plurality of cells partitioned by partition walls mainly composed of ceramics, each cell penetrating from a first end surface to a second end surface to form a flow path for a first fluid;
   an inner tubular member fitted to an outer peripheral side surface of the honeycomb structure to circumferentially cover the outer peripheral side surface of the honeycomb structure;
   a spacer directly and circumferentially covering an outer peripheral side surface of the inner tubular member as well as indirectly and circumferentially covering the outer peripheral side surface of the honeycomb structure;
   an outer tubular member directly and circumferentially covering the spacer;
   at least one opening part configured to form a gate of the spacer for a second fluid between the inner tubular member and the outer tubular member; and
   a casing circumferentially covering the outer tubular member,
   wherein the casing includes an inlet and an outlet for the second fluid,
   wherein a flow path for the second fluid in communication with the spacer is formed between the casing and the outer tubular member, and
   wherein the spacer has a three-dimensional structure that can allow flowing of the second fluid therein and suppress movement of bubbles in the second fluid.

2. The heat exchanger according to claim 1, wherein the spacer comprises a mesh structure.

3. The heat exchanger according to claim 1, wherein a ratio of an area of a portion of the outer peripheral side surface of the honeycomb structure that is indirectly and circumferentially covered with the spacer, to a total area of the outer peripheral side surface of the honeycomb structure is 80% or more.

4. The heat exchanger according to claim 1, wherein the spacer is made of metal.

5. The heat exchanger according to claim 1, wherein a ratio of an area of a portion of an outer peripheral side surface of the spacer that is directly and circumferentially covered with the outer tubular member, to a total area of the outer peripheral side surface of the spacer is 80% or more.

6. The heat exchanger according to claim 1, wherein a whole of the outer peripheral side surface of the honeycomb structure is circumferentially covered with the inner tubular member.

7. The heat exchanger according to claim 1, wherein the spacer and the inner tubular member are provided as a single component.

8. The heat exchanger according to claim 1, wherein the spacer and the inner tubular member are provided as separate components.

9. The heat exchanger according to claim 1, wherein the spacer has a thickness of from 0.001 mm to 10 mm.

10. The heat exchanger according to claim 1, wherein the inner tubular member and the outer tubular member are made of different metals.

11. The heat exchanger according to claim 1, wherein the outer peripheral side surface of the inner tubular member is provided with at least one step or protrusion that prevents the spacer and the outer tubular member from moving in an axial direction of the inner tubular member.

12. The heat exchanger according to claim 1, wherein the at least one opening part between the inner tubular member and the outer tubular member is annularly provided at each end portion in an axial direction of the outer tubular member.

* * * * *